(12) United States Patent
Bartolomé Garcia et al.

(10) Patent No.: US 7,976,048 B2
(45) Date of Patent: Jul. 12, 2011

(54) PORTABLE SAFETY, ENTERTAINMENT AND COMMUNICATION DEVICE FOR BICYCLES AND CONTROL METHOD

(75) Inventors: Jesús Bartolomé Garcia, Madrid (ES); José Angel Zabalegui Labarta, Madrid (ES)

(73) Assignee: Good For You Good For The Planet, S.L., Madrid (ES)

( * ) Notice: Subject to any disclaimer, the term of this patent is extended or adjusted under 35 U.S.C. 154(b) by 692 days.

(21) Appl. No.: 11/916,504

(22) PCT Filed: Nov. 28, 2006

(86) PCT No.: PCT/ES2006/000662
§ 371 (c)(1),
(2), (4) Date: Dec. 4, 2007

(87) PCT Pub. No.: WO2008/059073
PCT Pub. Date: May 22, 2008

(65) Prior Publication Data
US 2010/0194130 A1    Aug. 5, 2010

(30) Foreign Application Priority Data
Nov. 15, 2006   (WO) .................. PCT/ES2006/000630

(51) Int. Cl.
*B62J 11/00* (2006.01)
(52) U.S. Cl. ..................................... 280/288.4; 224/412
(58) Field of Classification Search ............... 280/288.4; 224/409, 412
See application file for complete search history.

(56) References Cited

U.S. PATENT DOCUMENTS

| | | | | |
|---|---|---|---|---|
| 3,714,412 | A * | 1/1973 | Franklin | 362/158 |
| 5,690,410 | A * | 11/1997 | Lin | 362/473 |
| 5,775,555 | A * | 7/1998 | Bloemer et al. | 224/531 |
| 6,281,674 | B1 * | 8/2001 | Huang | 324/174 |
| 6,557,437 | B2 * | 5/2003 | Masui et al. | 74/551.8 |
| 7,062,225 | B2 | 6/2006 | White | |
| 7,192,169 | B2 * | 3/2007 | Takeda | 362/475 |
| 7,623,931 | B2 * | 11/2009 | Campagnolo et al. | 700/17 |
| 7,714,704 | B1 * | 5/2010 | Mellen | 340/425.5 |
| 2004/0172178 | A1 * | 9/2004 | Takeda et al. | 701/29 |
| 2006/0088758 | A1 * | 4/2006 | Wu | 429/97 |
| 2006/0197354 | A1 | 9/2006 | Stigger | |
| 2007/0197261 | A1 * | 8/2007 | Humbel | 455/558 |

FOREIGN PATENT DOCUMENTS

| | | |
|---|---|---|
| DE | 202005006996 | 7/2005 |
| WO | 03094409 | 11/2003 |

* cited by examiner

*Primary Examiner* — Tony H. Winner
(74) *Attorney, Agent, or Firm* — Tristan A. Fuierer; Moore & Van Allen, PLLC; Andy Gerschutz (57) ABSTRACT

A portable safety, entertainment and communication device for a bicycle is provided. The device brings together a plurality of functions in a single device that can be fixed to the handlebar of a bicycle. The device is configured to automatically detect whether a casing is connected to a support and change the functionality of various elements of the device if so. In one aspect, the device changes the functionality of a digital music player so that a user may listen to music through speakers when the casing is connected to the support and listen to music through headphones connected to an audio output port when the casing is not connected to the support. Various other modules providing functionality may also be included in the device, such as a video camera and/or digital camera and a light source.

13 Claims, 6 Drawing Sheets

PORTABLE SAFETY, ENTERTAINMENT AND COMMUNICATION DEVICE FOR BICYCLES AND CONTROL METHOD

CROSS-REFERENCE TO RELATED APPLICATIONS

This application is filed under the provisions of 35 U.S.C. §371 and claims the priority of International Patent Application No. PCT/ES2006/000662 filed on 28 Nov. 2006, which in turn claims priority of International Patent Application No. PCT/ES2006/000630 filed on 15 Nov. 2006.

OBJECT OF THE INVENTION

The present invention relates to an accessory for bicycles, specifically to a portable device bringing together safety, entertainment and communication functions, forming an integrated assembly that can particularly be coupled on the handlebar of the bicycle, combining a series of functions such as position signaling and nighttime lighting, electronic horn, digital music player, and digital intercommunication system, though the device can obviously integrate other complementary functions.

The invention also contemplates a control method for controlling the portable device comprising a series of protocols that can be initialized automatically in starting up the device itself, a detection protocol aimed at detecting the fixing of the device on the bicycle, and a safety protocol focused on the safety of the user of the bicycle who disables certain functionalities of the device, mainly auditory functionalities.

The invention is therefore comprised in the technical field of electronic accessories for bicycles.

BACKGROUND OF THE INVENTION

According to the current state of the art, the most popular devices designed especially for being coupled to the handlebar of a bicycle have been performance computers, which provide and show information relating, for example, to the speed at which the bicycle is traveling, the distance traveled, etc. Devices have also been developed in recent years which further combine the possibility of measuring heart rate by means of sensors arranged on the handlebar of the bicycle.

An infinite number of fixing supports and supports for devices of different natures have been designed, such as those used mainly for carrying mobile telephones, for example.

Some of these fixing and support devices further include a cable and connector supplying the power generated and transformed by the dynamo to the device it carries.

In some cases, sophisticated supports have been designed which, whether distributed along the bicycle or not, support and bear speakers and music playing apparatuses. In other cases, audio systems always formed by more than one element have been invented in addition to the support itself.

Precisely regarding obtaining an audio form more suited to the means in which it is intended to be used, such as the bicycle in this case, systems combining elements located in a helmet, for example, and in the handlebar have been provided which, by means of using earphones and cables, though also using wireless devices such as radio-frequency or Bluetooth, transmit music from the player usually located on the handlebar to the earphones.

Specific devices for signaling and lighting are also known which are arranged in different parts of the bicycle such as the handlebar, wheels, etc. . . . , and the lighting can usually come from incandescent lamps or LED lamps. These devices in turn are fed by a battery or use an instant generation and feed system, such as for example a dynamo. The proliferation of this type of signaling devices notifying the user's position, mostly when it is dark, has been essential in increasing safety for cyclists.

As can be seen, there are a number of different devices which can be acquired for communicating, signaling position, notifying arrival, and fixing devices or systems which would allow hearing a song or the radio.

In most of the examples set forth above, the common feature to be stressed is that they have not taken into account in their respective embodiments safety of the cyclist, or the space and weight the bicycles can support for normal operation. In other cases, the manner in which certain fixing apparatuses and systems are coupled to the bicycle is not specified or is rather unrealistic, and they do not take into account, for example, the fact that said fixing apparatuses systems must be portable or have an anti-theft system.

Patent document US2003/0036360 can specifically be mentioned, which describes a built-in portable entertainment, information and communication system wirelessly associated to a helmet. The drawback of this patent is the fact that the helmet with earphones is not at all suitable for riding a bicycle, given that it is dangerous, so much so that in many countries it is prohibited, therefore the way of hearing the communication is not suitable.

Patent document US2005/0197063 describes a pedometer or apparatus for measuring an athlete's performance, and this apparatus can incorporate many functions, such as MP3 and the like. It is apparently a device for jogging. In any case it is not especially designed for a bicycle, given that it uses earphones and does not indicate how it is fixed to the bicycle. It does not provide any feasible solution to hear music, for lights, to be able to talk, etc., from the bicycle without using hands.

For its part, patent document WO03094409 describes a portable audio apparatus containing divided transmission and sound signals. This patent does not resolve the problem of integration given that it only refers to music. The arrangement of the elements it incorporates further involves the use of cables and makes it a non-portable system.

Patent document EP 1 564 122 describes a bicycle lighting apparatus with a mountable display. It therefore consists of a light apparatus which furthermore provides power to a processor, integrating no other functions such as audio, communication, a horn or photographic camera.

It can be deduced from the foregoing that the common denominator in the prior state of the art is that in order for the cyclist to have an optimal performance level in the previously mentioned components, it requires a great amount of space on the handlebar for implementing or fixing such components, making it necessary to double the size thereof, and the correcting handling of the handlebar would furthermore be impossible either due to the total weight of all these elements or because they would be arranged in a rather impractical manner for use. It is necessary to add to this common denominator, directly and with the same or greater importance, the risk involved for the cyclist's safety in using a series of devices located in different locations on the handlebar of the bicycle to obtain the functionalities that each of them may provide.

DESCRIPTION OF THE INVENTION

The device proposed by the invention resolves in a fully satisfactory manner the drawbacks set forth above, constituting a single compact, small-sized element that can be detachably mounted on the handlebar of a bicycle, and can easily be handled with a high performance level.

To that end and more specifically, said device integrates in a small casing provided with fixing means for fixing lights, a horn, a music player and an intercommunication system (walkie-talkie) to the handlebar of the bicycle, constituting a portable element, further including a speaker so that the music can be heard without needing to use earphones, which reduce the acoustic connection of the cyclist with his/her surrounding environment, and accordingly the safety of the cyclist, also including a VOX (voice operated transmission) system for being able to communicate by means of radio-frequency without needing to use his/her hands, specifically by means of the use of a microphone built into the device and the previously mentioned speaker, and it should be indicated that to assure the quality in the voice operated transmission, the device has been provided with a connection jack for an auxiliary microphone with an extensible cable.

It includes a voice recognition module for remotely actuating certain functionalities of the device and, like in the previous cases, not having to use his/her hands or stop.

It also includes an electronic system, which could optionally be mechanical or electrical, by means of which the apparatus detects that it has been fixed to the handlebar of the bicycle, and in a programmed or automatic manner renders the earphone audio functions and the push button for communication with WT useless, whereas it simultaneously activates the audio music speaker and activates the VOX system.

The device also includes a visually communication display for communicating with the cyclist, it includes keys or buttons for quickly actuating the horn and lights and includes a USB port for transmitting data from external memory devices and for connecting to a webpage.

DESCRIPTION OF THE DRAWINGS

To complement the description being made and to aid in better understanding the features of the invention according to a preferred practical embodiment thereof, a set of drawings is attached to said description as an integral part thereof which show the following with an illustrative and non-limiting character.

PREFERRED EMBODIMENT OF THE INVENTION

Figure 1:
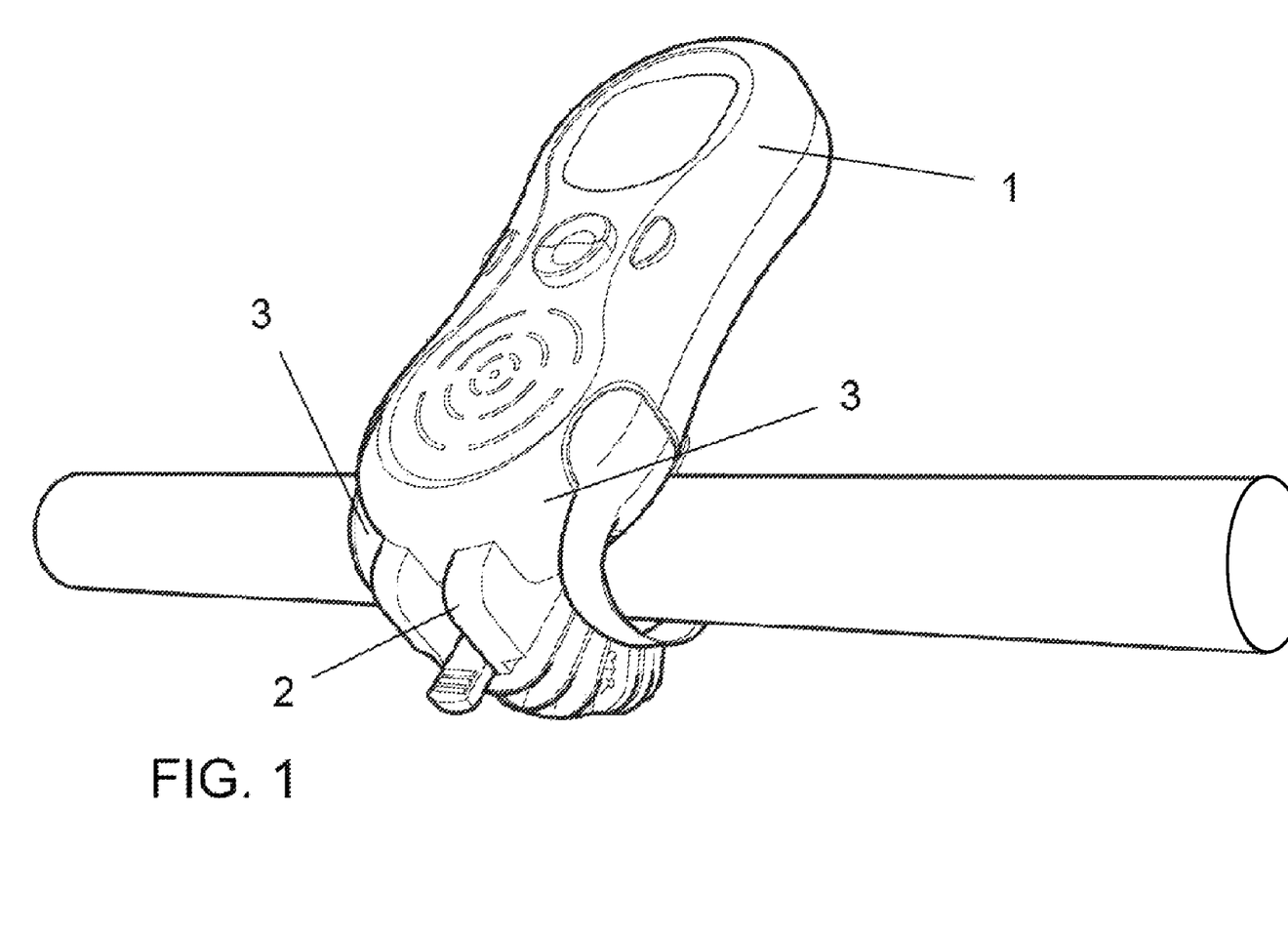
FIG. 1 shows a perspective view of a schematic representation of the (equipment, system, device) once installed on the handlebar of a two-wheel vehicle, such as a bicycle for example, of an electric bicycle or of a motorcycle.

In view of the mentioned figures, it can be observed how the device proposed by the invention is formed by a casing (1) especially designed for the fixing thereof to the handlebar of a bicycle, as shown in FIG. 1, by means of a suitable fixing system (2), reinforced by a multifunctional elastic band (3).

Figure 2:
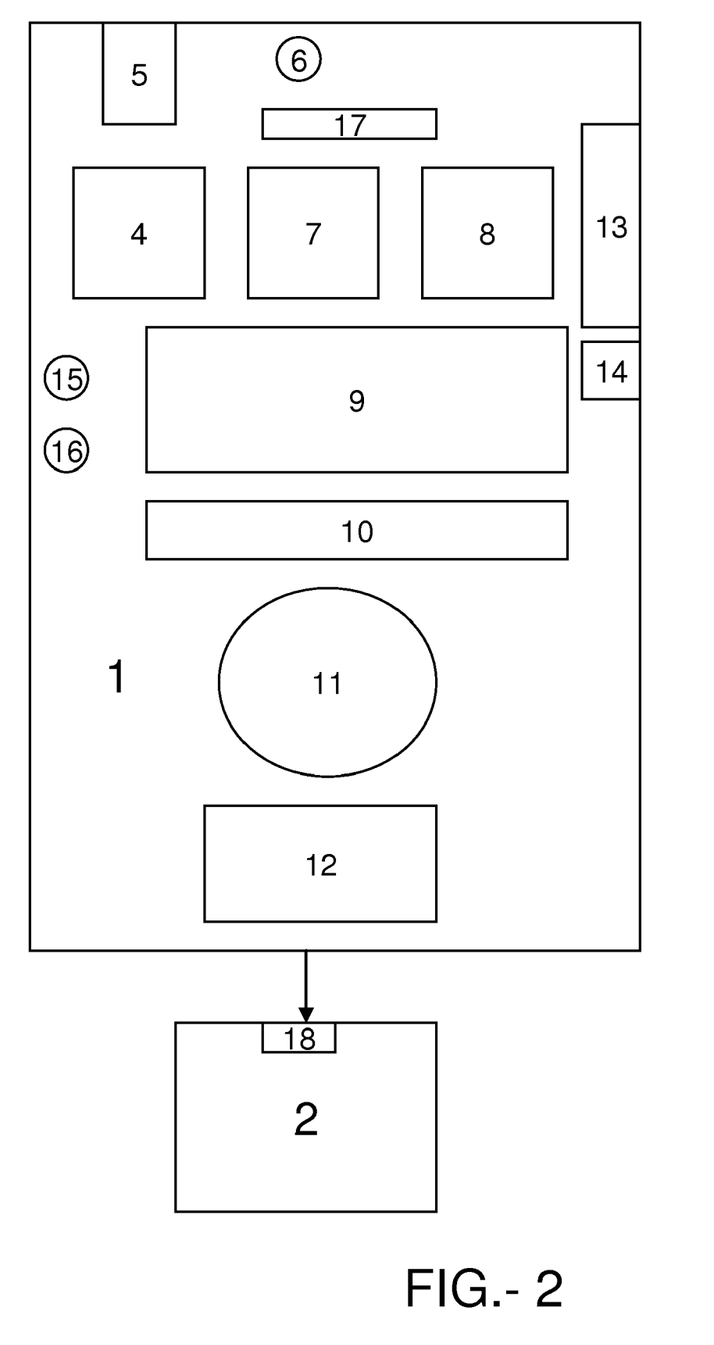
FIG. 2 shows a schematic representation of the internal functional electronic configuration of the invention.

In a first embodiment, several integrated modules connected to one another are arranged in the casing (1) allowing the operation of the different mentioned functionalities, as shown in FIG. 2, specifically a lighting module (17), digital music playing means (7) with or without an internal memory, horn means, digital intercommunication means (5) with other devices, and presence detection means (18) for detecting the device in the fixing system (2) connected to the power module (12) once both elements (1) and (2) are coupled.

In a first particular embodiment, the digital intercommunication means use radio-frequency technology, and in a second particular embodiment they use Bluetooth technology.

The device additionally comprises an antenna (4), a microphone (6), a video camera and/or digital camera module (8) with its corresponding lens, a graphic or color display module (9), an internal button assembly (10) allowing access to the different functionalities and browsing, a speaker (11) allowing playing sounds, music and voice; a power module (12) with its corresponding battery, an external memory port (13), a port (14) for connecting to a personal computer, an input port for an external microphone (15), an audio output port (16), and a brightness level detector.

Figure 3:
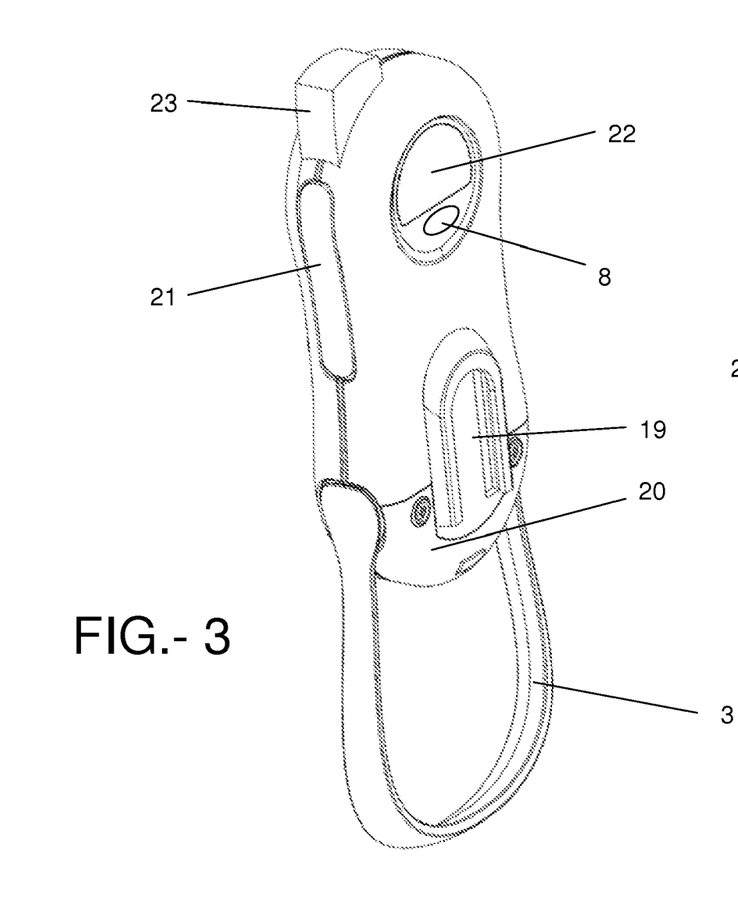
FIG. 3 shows a perspective view of the back of a possible external physical configuration of the mechanical components of the invention.
Figure 4:
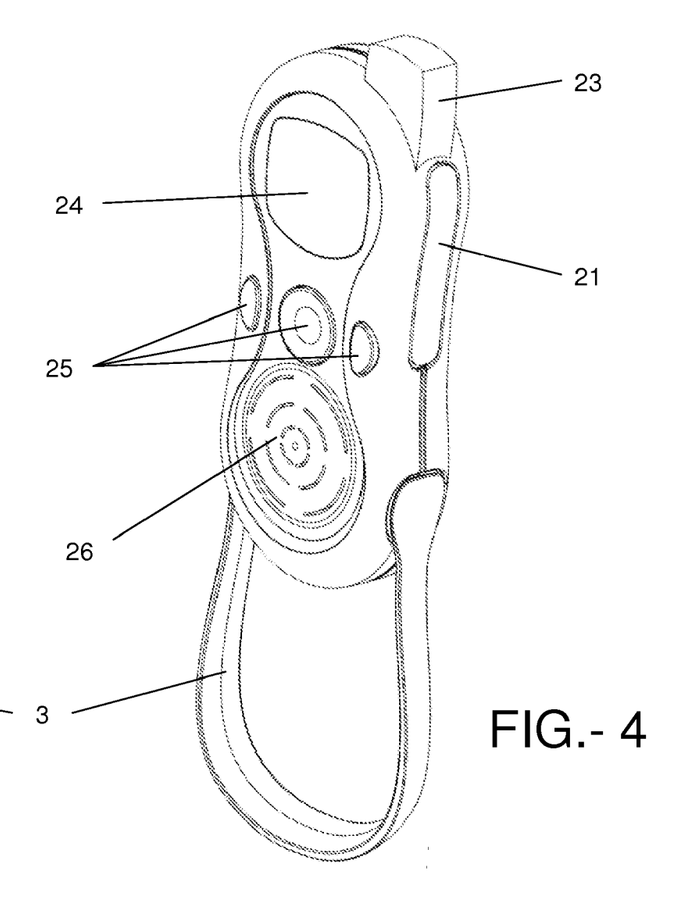
FIG. 4 shows a perspective view of the obverse of a possible external physical configuration of the mechanical components of the invention.

As previously mentioned, FIG. 3 shows the back of the device, where the fixing system (19) complementary to the previously mentioned fixing system (2), the multifunctional elastic band (3), an access (20) to the power module (12) and more specifically to the battery of the module, a protected area (21) providing access to the mentioned ports (13), (14), (15) and (16), an optic (22) specific for the lighting module (17), the lens of the video camera and/or digital camera module (8) and a housing (23) for the also mentioned antenna (4) of the device can be seen, whereas FIG. 4, corresponding to the obverse thereof, shows the window (24) provided for seeing the graphic display or color module (9), an assembly of external buttons (25) for actuating the corresponding internal button assembly (10), and the housing (26) for the speaker (11).

Figure 5:
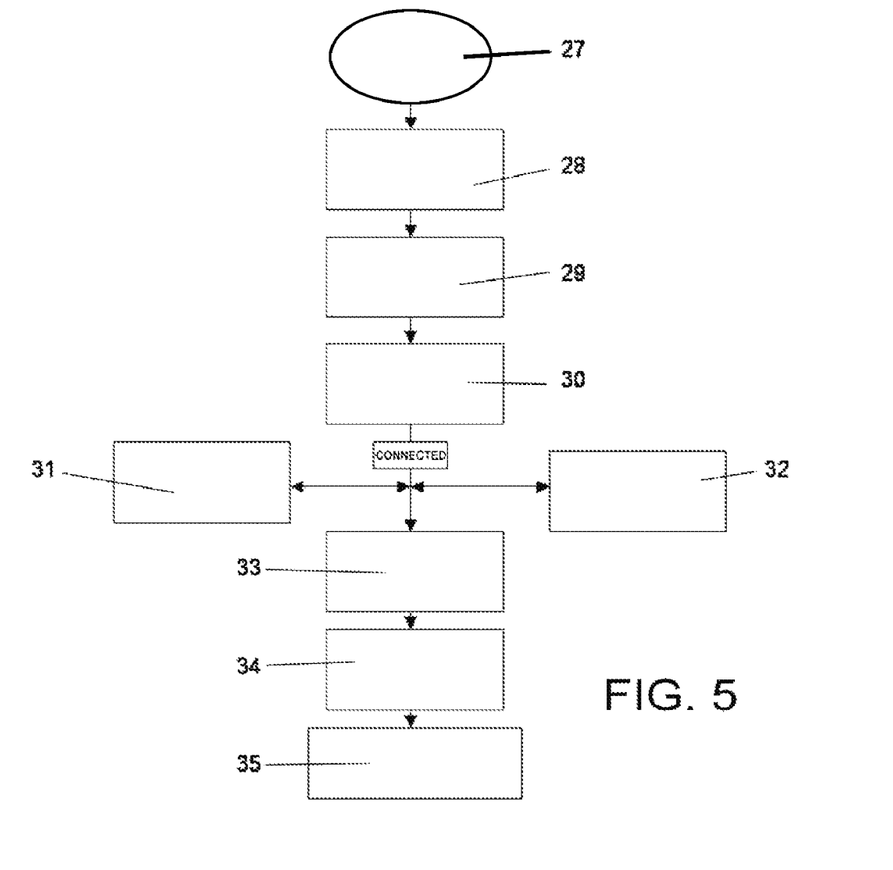
FIG. 5 shows a flowchart of the installation of the management program of the device object of the present invention and its interactivity with the internal program of the device and the remote database designed to include the data for the installation, identification and authentication of the user and for storing all those data which are needed to offer optimized management and/or added value services for the user.

According to this structure and with the collaboration of a self-executable program (27) in a storage system such as a CD-ROM for example, the user can easily install the management program of the device (28) in his/her personal computer or PC. Once the client program is installed, it automatically starts to offer its functionalities and options to the user (29), as shown in the flowchart of FIG. 5, visibly carrying out different functions towards the user in a transparent manner for him/her. The program specifically launches a detection protocol of the connectivity (30) between the PC and the device (31), and between the PC and the Internet network (32) for enabling the exchange of information and requirements between device, PC and remote database. The management program will ask the user who is connected to the device or to Internet, or to both at the same time, for the instructions to carry out the different tasks, execute orders and generally manage the device.

The first time a user installs the management program and connects his/her device to his/her PC and the latter, in turn, is connected to Internet, the system will assign the device a unique identifying marker which is available in the remote database (33) and which will be unequivocally and uniquely associated to the user profile that the user himself/herself assigns at the time of the installation and which he/she can modify at any time. Among other records, this profile includes an alias or nickname and a password such that safe and private use of his/her device, the management program and the remote services provided through the Internet network is assured. This alias and password will be required every time that the user wishes to act on the device through the management program or wishes to access the remote services.

Once the user is authenticated, it could handle the different settings of the device (34), such as the setting of the time, date, for changing sounds, for handling the sound of the keys, creating private groups, changing his/her alias, etc.

Once the process for installing the management program has ended and the recording and assignment of the unique identifying marker has been carried out, the device object of the present invention and the different elements for its management and service are fully operative and available to the user (35).

Figure 6:
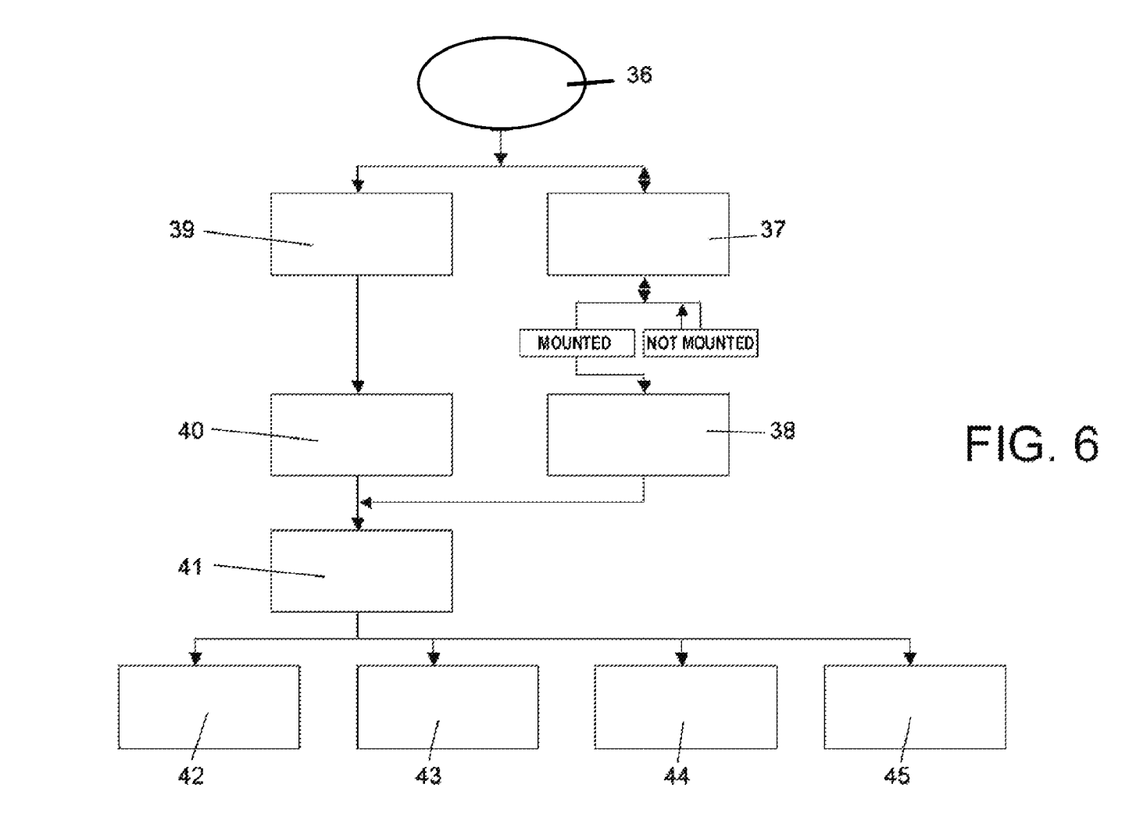
FIG. 6 shows the operating flowchart of the device when it is used formally and independently of the management system of the device and in reference to the communication functionalities.

Once the device (36) is started up, the modules forming it, its processor or processors and its internal program automatically launches two protocols: the safety protocol (37) and the detection protocol (39).

The safety protocol (37) checks the state of the device in relation to whether or not it is coupled to the fixing system (2) for fixing it to the two-wheel vehicle. This protocol is always on alert for detecting at any time if the device is installed or uninstalled in the fixing system (2). The purpose of this protocol is to increase the safety of the user when he/she uses the device object of the present invention installed in the bicycle, an alternation of functions occurring according to if it is in one state or another (38).

As specific though non-limiting examples, the alternation first mentioned is the alternation of the possibility of listening to music of the player with stereophonic earphones as the result of a jack-type connector (16) when it is not installed in the bicycle to listening to the music exclusively as a result of one or more speakers (26) included in the device when it is installed in the bicycle. This allows the user to listen to the environmental sound, and more specifically sounds or horns warning of the presence of other vehicles and allowing to user to comply with the rules for using stereophonic earphones while riding a bicycle which is prohibited in many countries.

The second alternation mentioned is the alternation of a hands-free system to a touch system for speaking for the case of the communication module. The communication module will pass to a hands-free a system if the safety protocol (37) detects that the device is mounted in the fixing system (2) such that the user does not have to press any key to be heard and as a result of the microphone (6) included in the device; if the device is not mounted in the fixing system (2) the user may continue to using the hands-free system or alternate it to the touch mode for speaking.

The detection protocol (39) is in turn launched automatically and independently of the safety protocol (37) and its management corresponds to the digital radio-frequency module (4). The focus of this protocol is to emit and receive a radio-frequency signal and process it to first detect the presence of homologous devices in the coverage area and second to identify the unique identifying marker of said devices (40). A list of corresponding aliases is prepared with the identified markers which is deployed and displayed on the graphic display (9). This protocol (39) is continually active and periodically updates the list of aliases.

Once both protocols (37) (39) are launched, the different communication protocols are activated (41).

The communication protocol (42) allows setting up one by one a bidirectional and private communication between two single devices in the following manner: a user identifies a third user present in the coverage area appearing on the identification list as a result of protocol (39), either of the two users selects the alias with which he/she wishes to set up communication, opens the options menu and indicates to the device the desire to set up communication one by one, the receiving user will at that time receive a call acceptance message; in the event of accepting the call, and transparently for the users, the communication protocol is set up one by one (42).

The private group communication protocol (43) operates in a manner similar to the previous manner, although it is formed by two or more members. The prompting user of the group selects from the list set up by the protocol (39) the members who he/she wishes to invite to a private group; once selected, it displays the options menu and indicates to the device the desire to set up a private group; once the option is selected, the prompting device sends an invitation message to the members which are desired to enter in the group; the devices which accept said invitation will generate, in a transparent manner for the users, a private group that is identical to the characteristics proposed by the prompting device; a clone private group is thus set up in each of the invited devices. As in the previous case (42), the communication set up by this protocol (43) is private.

The communication protocol in a public channel (44) operates in a manner similar to the previous one (43) even though the groups are public, i.e. any user who wants to can enter and they are selected independently of the detection protocol (39). Any user who wants to can activate this protocol by manually selecting one of the public channels provided for that purpose through the options menu; once this protocol (44) is launched, the user will enter in communication with whoever is in the same public channel.

In any case, and for the mentioned communication protocols (42) (43) and (44), the detection protocol (39) allows associating the voice of a user to his/her alias, which allows a user who hears the voice of another user through his/her device to identify the alias of the receiver to be recognized on his/her graphic display (9). This function is very useful because, for example and in the case of the public channel communication protocol being used, the system identifies the alias of the transmitter and allows the receiver to determine the identity of the emitter, even without knowing who is in a certain public channel.

The contact list communication protocol (45) allows a user to temporarily store the aliases that have been or are present in the list resulting from the protocol (39), such that once the device is connected to the PC of the user and the management program of the device (28) is launched, these stored aliases will be loaded in the management program, allowing a subsequent communication through Internet using known means, for example chat systems, e-mail, VoIP (Voice over Internet Protocol) or the like, allowing a non-presential communication which is not dependent on the device itself. In the case of using VoIP and in the case that the PC of the user lacks a microphone and speaker needed for setting up communication, the microphone (6) and the speaker (26) of the device can be used to allow this communication.

Figure 7:
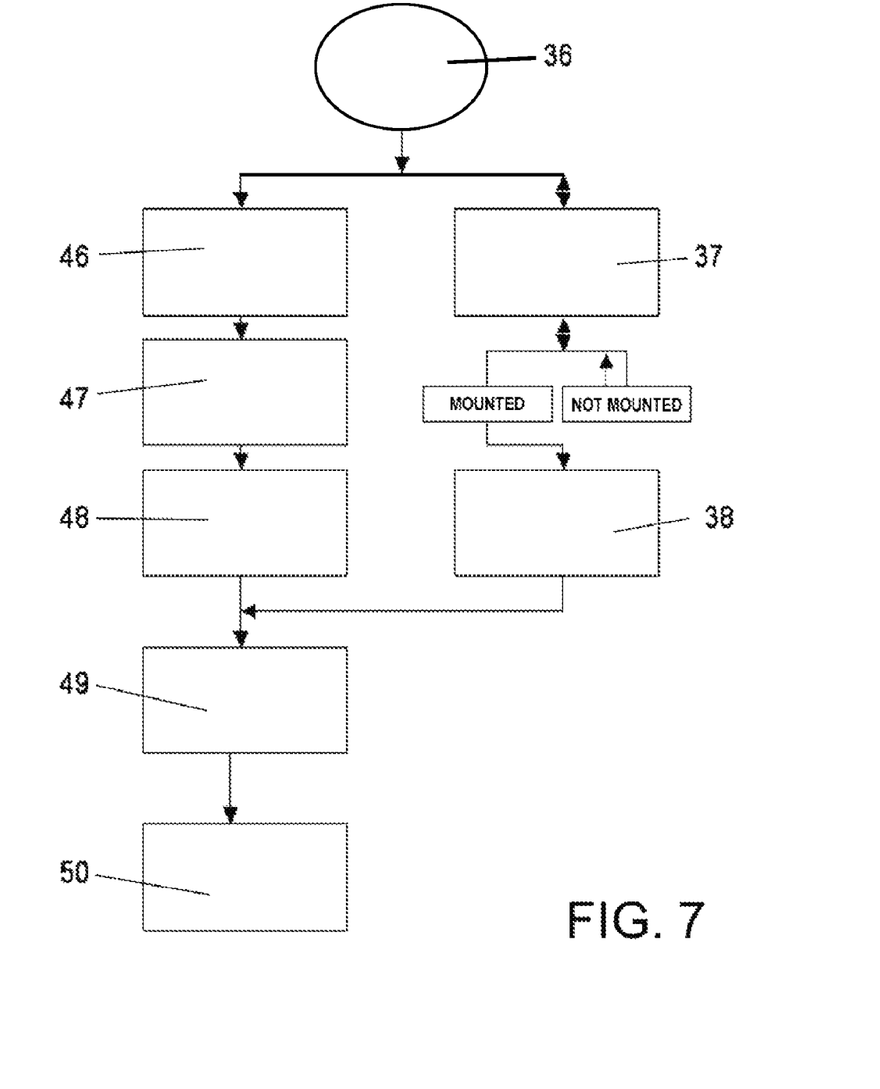
FIG. 7 shows the operating flowchart of the device when it is used formally and independently of the management system of the device and in reference to the music playing functionalities.

As in the case of FIG. 6, in FIG. 7 the detection (39) and safety (37) protocols are active, although in this case and for facilitating understanding thereof, the detection protocol (38) is visually eliminated and replaced by the music playing protocol (46).

As previously mentioned, the safety protocol (37) is activated once the operations of the device (36) are initiated, in this case, and as previously mentioned, the music will be played either solely and exclusively through the speaker (26) or indistinctly through said speaker or stereophonic earphones that can be coupled to the audio output (16) of the device, depending on the safety rules applied by the protocol (37).

The music playing protocol (46) first detects accessibility to the memory (47) containing the digital music files; this step is needed to identify and verify the correct insertion of the memory in the case that the device uses an external memory coupled to the port (13) of the device, thus being able to notify the user of different situations in which the card is either not coupled or is incorrectly coupled.

Once the memory is detected, the device opens in the graphic display (9) the song list and/or play list (48) that the user was able to record using the management program (29) of the device or through means other than the device, such that the user selects the file he/she wishes to play in the device (49).

Once the music is playing, the play controls are managed (50) by the multifunction button (25), being able to flip forwards and backwards through files, to turn the volume up or down or access the options menu of this protocol (46).

The different protocols (37) (39) (41) and (46) are kept active and/or in stand-by, allowing interactivity between them in any case and/or at any time.

The invention claimed is:

1. A portable safety, entertainment and communication device for a bicycle the device comprising:
   a support (2), wherein the support (2) is configured to attach a casing (1) to a handlebar of the bicycle; and
   wherein the casing (1) comprises:
      lighting means (17),
      digital music playing means (7),
      horn means,
      digital intercommunication means, and
      automatic detection means, (18)
   wherein the automatic detection means (18) is configured to detect whether the casing (1) is connected to the support (2), and
   wherein the device is configured to change functionality of at least one of the lighting means (17), the digital music playing means (7), the horn means, and the digital intercommunication means when the casing (1) is connected to the support (2).

2. The device according to claim 1, further comprising a hands-free system.

3. The device according to claim 1, further comprising digital video and photograph capture means.

4. The device according to claim 1, wherein the support (2) is reinforced by a multifunctional elastic band (3).

5. The device according to claim 1, wherein the digital intercommunication means comprises radio-frequency technology.

6. The device according to claim 1, wherein the digital intercommunication means comprises Bluetooth technology.

7. The device according to claim 2, further comprising:
   an antenna (4),
   a microphone (6),
   a graphic display (9) for displaying information,
   an internal button assembly (10) for accessing the different functionalities and for browsing,
   a speaker (11),
   a power module (12) for feeding the device,
   an external memory port (13),
   a communications port (14),
   an input port (15) for an external microphone,
   an audio output port (16),
   a brightness detector associated to the lighting means (17), and
   a voice recognition module for activating functionalities of the device.

8. The device according to claim 7, wherein the device is configured to deactivate the audio output port (16) and activate the hands-free system when the automatic detection means (18) detects that the casing (1) is connected to the support (2).

9. The device according to claim 7, further comprising a protected area (21) that provides access to the external memory port (13), the communications port (14), the input port (15) for the external microphone, and the audio output port (16).

10. A control method for controlling the device of claim 1, the control method comprising:
   determining by means of a safety protocol (37) whether the casing (1) is connected to the support (2); and
   detecting by means of a detection protocol (29) whether a homologous device is present in a coverage area,
   wherein the safety protocol (37) and the detection protocol (29) are automatically and independently executed after starting up (36) the device.

11. The control method according to claim 10, wherein the safety protocol (37):
   activates a jack connector (16) that allows listening to music through stereophonic earphones when the casing (1) is not connected to the support (2); and
   deactivates the jack connector (16) and plays music through one or more speakers (26) when the casing (1) is connected to the support (2).

12. The control method according to claim 10, wherein the detection protocol (39):
   emits and/or receives a radio-frequency signal;
   processes the radio-frequency signal to detect homologous devices in the coverage area;
   identifies unique identifying markers of said homologous devices;
   prepares a list of aliases corresponding to the unique identifying markers; and displays the list of aliases on a graphic display (9).

13. The control method according to claim 12, wherein the detection protocol (39) is periodically updating the list of aliases.

* * * * *